(12) United States Patent
Wormer et al.

(10) Patent No.: US 7,933,291 B2
(45) Date of Patent: Apr. 26, 2011

(54) PROTOCOL NEUTRAL CHANNEL-BASED APPLICATION COMMUNICATION

(75) Inventors: Joel Wormer, San Jose, CA (US); Héctor H. González-Baños, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 569 days.

(21) Appl. No.: 11/615,713

(22) Filed: Dec. 22, 2006

(65) Prior Publication Data

US 2008/0151932 A1    Jun. 26, 2008

(51) Int. Cl.
*H04J 3/22* (2006.01)
(52) U.S. Cl. ........ 370/466; 370/464; 370/465; 370/431; 709/223; 709/227; 709/228
(58) Field of Classification Search .................. 370/464, 370/465, 466; 709/223
See application file for complete search history.

(56) References Cited

U.S. PATENT DOCUMENTS

| | | | |
|---|---|---|---|
| 5,513,126 A * | 4/1996 | Harkins et al. | 709/228 |
| 6,008,923 A * | 12/1999 | Samdahl et al. | 398/127 |
| 6,370,590 B1 * | 4/2002 | Nitz et al. | 719/317 |
| 6,640,245 B1 * | 10/2003 | Shen et al. | 709/216 |
| 6,874,016 B1 * | 3/2005 | Gai et al. | 709/215 |
| 6,954,525 B2 | 10/2005 | Deo et al. | |
| 7,373,632 B1 * | 5/2008 | Kawaguchi et al. | 717/100 |
| 7,477,285 B1 * | 1/2009 | Johnson | 348/143 |
| 2002/0174248 A1 * | 11/2002 | Morriss | 709/238 |
| 2003/0149806 A1 * | 8/2003 | Achacoso et al. | 710/4 |
| 2004/0003090 A1 * | 1/2004 | Deeds | 709/227 |
| 2004/0015366 A1 * | 1/2004 | Wiseman et al. | 705/1 |
| 2004/0064351 A1 | 4/2004 | Mikurak | |
| 2007/0299778 A1 * | 12/2007 | Haveson et al. | 705/51 |
| 2009/0031017 A1 * | 1/2009 | Elko et al. | 709/223 |

OTHER PUBLICATIONS

PCT International Search Report and Written Opinion, PCT/US07/60173, Mar. 27, 2008, 9 pages.
Gerardo Pardo-Castellote et al, *An Introduction to DDS and Data-Centric Communications*, [Online], [Retrieved on Jan. 30, 2008, last revision Aug. 12, 2005], Retrieved from the internet <URL:http://www.omg.org/news.whitepapers/Intro_To_DDS.pdf>.
Shridhar Diwan et al, *Adaptive Utilization of Communication and Computational Resources in High-Performance Distributed Systems: The EMOP Approach*, Proceedings of the HPDC, Jul. 1998, pp. 1-9.
Dr. Rajive Joshi, *An open standards approach to real-time COTS-based simulator design*, [Online], [Retrieved on Oct. 27, 2006, last updated on Jul. 5, 2006], Retrieved from the internet <URL: http://www.embedded.com/showArticle.jhtml?articleID=190300032>.

(Continued)

*Primary Examiner* — William Trost, IV
*Assistant Examiner* — Siming Liu
(74) *Attorney, Agent, or Firm* — Fenwick & West LLP; Mark E. Duell (57) ABSTRACT

A system is presented that enables applications in a distributed system to communicate through a channel-based communication system. The applications use adaptors which communicate through a communication mechanism, resulting in application independence from the communication mechanism. In one embodiment, the communication mechanism consists of transmission media, logical channels, and brokers. The adaptors communicate with each other over the transmission media. Groups of adaptors involved in a particular type of communication form a communication channel. Channel profiles, which include channel properties and a list of adaptor members, are stored in brokers which can be queried by adaptors. Adaptors can support channel-specific data processing operations specified in the channel profile. Adaptors can join a channel, leave a channel, and communicate with other adaptors over the channel.

15 Claims, 9 Drawing Sheets

OTHER PUBLICATIONS

*JGroups—A Toolkit for Reliable Multicast Communication*, [Online], [Retrieved on Jan. 30, 2008], Retrieved from the internet<URL:http://www.jgroups.org/javagroupsnew/docs/index.html>.

*High Level Architecture*, [Online], [Retrieved on Jan. 30, 2008, last updated on Dec. 12, 2005], Retrieved from the internet<URL:https://www.dmso.mil/public/transition/hla/>.

*RTI Data Distribution Service Real-Time Publish-Subscribe Networking Middleware*, [Online], [Retrieved on Jan. 30, 2008], Retrieved from the internet<URL:http://www.rti.com/docs/RTI_DDS_41.pdf>.

Ken Birman et al, *Scalable Multicast Platforms for a New Generation of Robust Distributed Applications*, [Online], [Retrieved on Jan. 30, 2008], Retrieved from the internet<URL:http://www.cs.cornell.edu/projects/quicksilver.public_pdfs/comsware06-V2.pdf>.

Prasun Dewan, *The Design Space of Collaboration Infrastructures*, [Online], [Retrieved on Jan. 30, 2008], pp. 1-80, Retrieved from the internet<www.cs.unc.edu/~dewan/290/f06/notes/colab-impl-public.pdf>.

\* cited by examiner

PROTOCOL NEUTRAL CHANNEL-BASED APPLICATION COMMUNICATION

BACKGROUND OF THE INVENTION

1. Field of the Invention

The present invention relates to data communications between applications.

2. Description of Background Art

A distributed system may contain many applications, each performing some function needed by the overall system. For example, one application may be a digital interface to a video camera and another application may be control software on a robot arm. A distributed system may consist of one camera application sending data to three robot arm applications that use the data to determine when and how to move. In general, an application may be implemented in hardware or software or both and is capable of digital communication.

Often, a particular group of applications in a distributed system will need to communicate with each other. In the example above, the camera application is sending data while the robot arm applications are receiving it. This may be considered a communication channel which has one server application and three client applications. In many distributed systems, each application needs to know the location of the other applications and contain programming to connect to and communicate with the other applications. As the number of applications increases, each application must store more location information and must handle greater numbers of connections to other applications. Also, when the configuration of the network is modified, the applications may need to be modified to support the new configuration, for example to communicate using different protocols.

Communication between applications in a distributed system should be flexible and efficient. Often, communication systems require the registration of data types with a central broker and require the maintenance of these types. This limits the flexibility of applications by requiring broker-supported types and decreases the efficiency of the system by requiring type registration with a central broker.

What is needed is a channel-based, application-independent communication system for protocol-neutral data communications between applications in a distributed system.

SUMMARY OF THE INVENTION

Systems and methods are presented that enable applications in a distributed system to communicate through a channel-based communication system. The applications use adaptors which communicate through a communication mechanism, resulting in application independence from the communication mechanism.

In one embodiment, the communication mechanism consists of transmission media, logical channels, and brokers. The adaptors communicate with each other over the transmission media. Groups of adaptors involved in a particular type of communication form a communication channel. Adaptors within a channel have particular roles, such as client, server, or peer. Information about channels and channel members is stored in brokers which can be queried by adaptors. Adaptors can join a channel, leave a channel, and communicate with other adaptors over the channel.

In one embodiment, the adaptor contains a channel interface to each channel of which the adaptor is a member. Each channel interface contains connections to other adaptors in that particular channel. A connection comprises a connection proxy that handles communication with the transmission media and a channel stack that performs channel-specific data processing operations such as ensuring a certain quality of service.

In one embodiment, the adaptor contains an application interface module which provides an application programming interface (API) for the application to send data over a channel and an event handler for the application to receive data from a channel.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

A preferred embodiment of the present invention is now described with reference to the figures where like reference numbers indicate identical or functionally similar elements. Also in the figures, the left most digits of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions)

leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Figure 1:
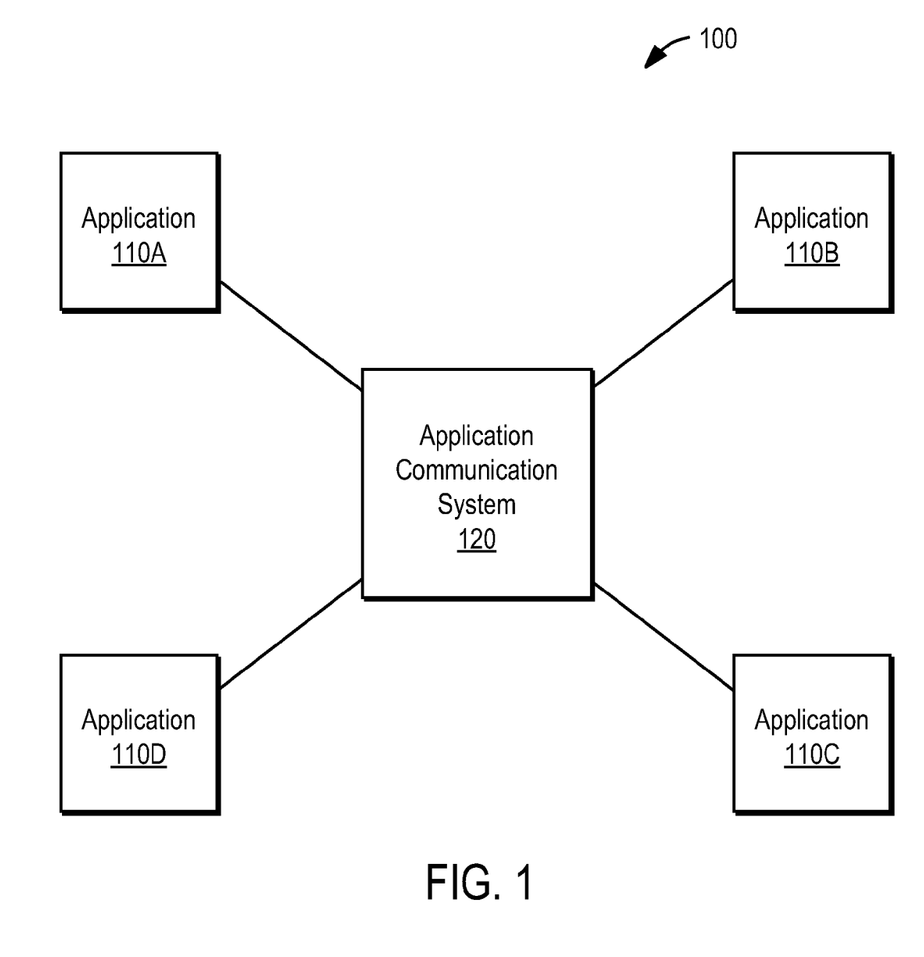
FIG. 1 illustrates a block diagram of a distributed system of applications, according to one embodiment of the invention.

FIG. 1 illustrates a block diagram of a distributed system of applications, according to one embodiment of the invention. The system 100 includes four applications 110A, 110B, 110C, 110D, and an application communication system 120. The applications each perform some function within the overall distributed system, while the application communication system enables the applications to send digital data to and from each other as necessary. For example, one application 110A may be a digital interface to a video camera and another three applications 110B, 110C, and 110D may each be control software for three robot arms. The application 110A may need to send data to applications 110B, 110C, and 110D to enable them to determine when and how to move. In general, an application is implemented in hardware or software or both and is capable of digital communication.

Figure 2:
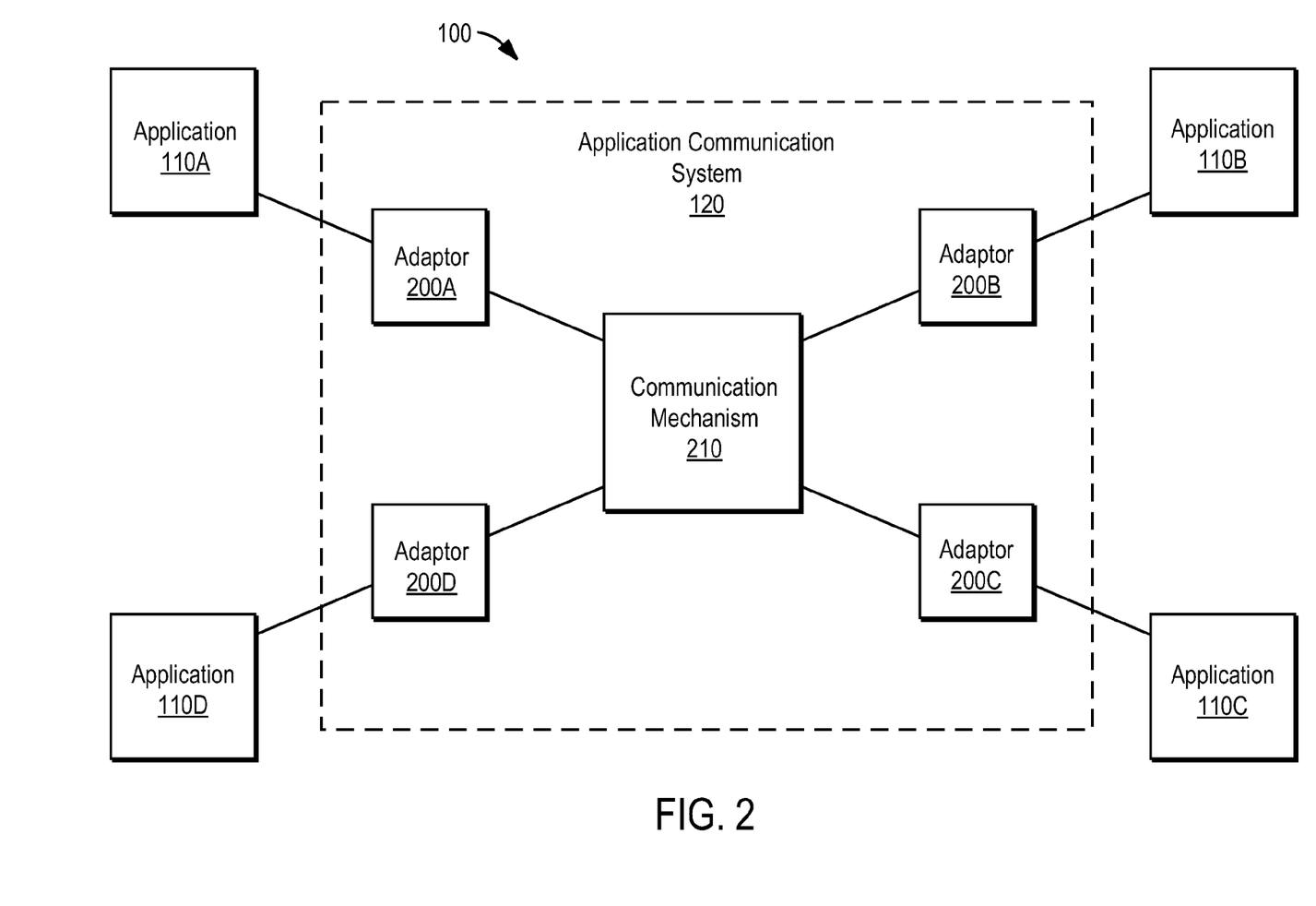
FIG. 2 illustrates a more detailed view of the block diagram shown in FIG. 1, according to one embodiment of the invention.

FIG. 2 illustrates a more detailed view of the block diagram shown in FIG. 1, according to one embodiment of the invention. The applications 110 communicate with adaptors 200 which in turn communicate with each other through communication mechanism 210. The separation of applications and adaptors enables an application to be created without concern for the details of the communication mechanism. An application needs only to be able to interact with an adaptor through a simplified interface, while the adaptor will handle the details of communication through channels with other adaptors through the communication mechanism. Additionally, the communication mechanism and the adaptors can be modified with minimal or no changes to the applications. In one embodiment, the communication between the application and the adaptor is data-neutral, meaning that the application sends and receives data in untyped byte streams. Applications communicate using their own internally-understood data types. This avoids the overhead of requiring applications to register data types with adaptors or brokers, and it increases the flexibility of application communications. The adaptors can be implemented in hardware, software, or both and are capable of digital communication. In one embodiment, the adaptor is located in the same physical or software module as the application.

Figure 3:
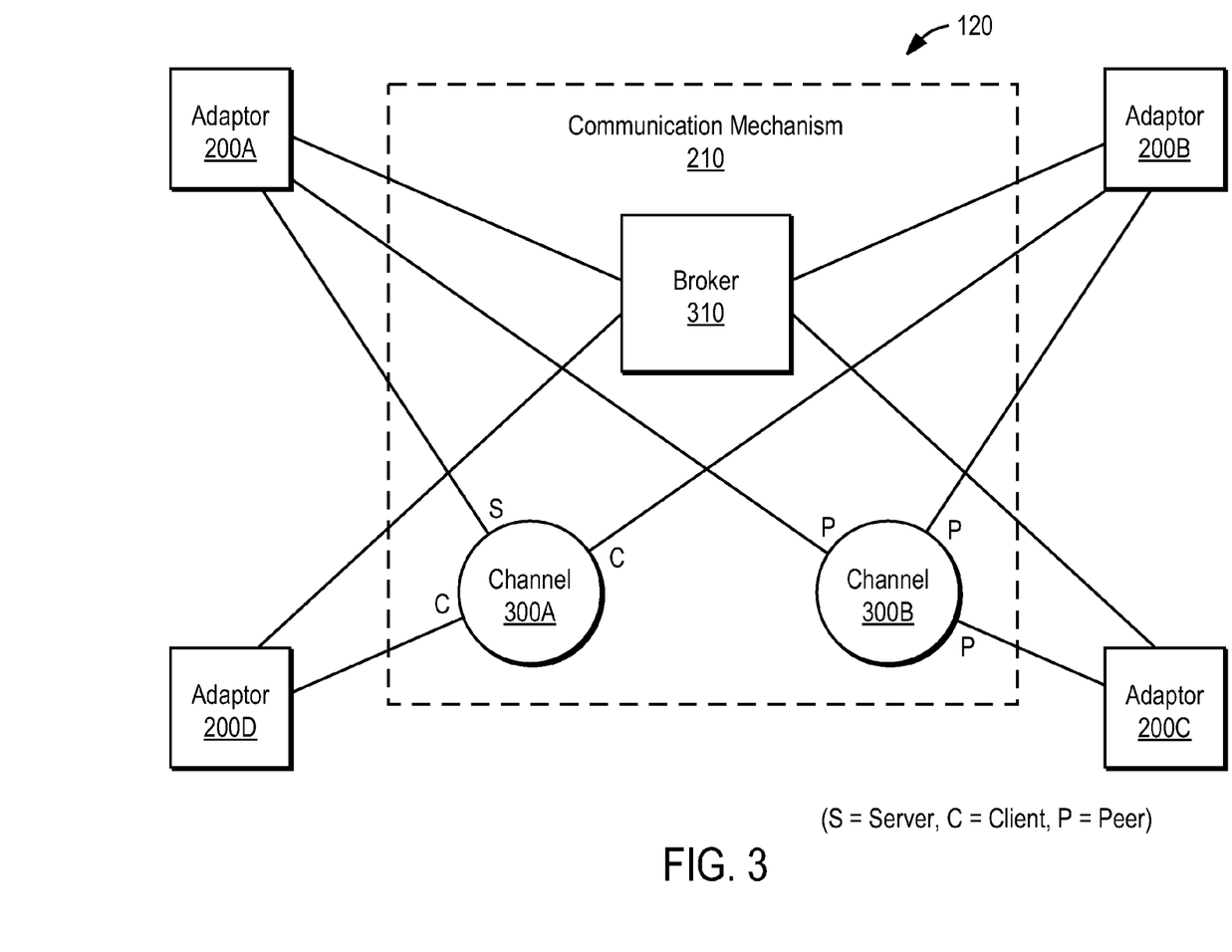
FIG. 3 illustrates a block diagram of an application communication system, according to one embodiment of the invention.

FIG. 3 illustrates a block diagram of an application communication system, according to one embodiment of the invention. As described above, the adaptors 200 communicate through a communication mechanism 210. The communication mechanism comprises one or more channels 300 and one or more brokers 310. The channels are logical communication groupings rather than physical entities. For example, channel 300A represents the communication between the group of adaptors 200A, 200B, and 200D. Though the adaptors are actually communicating with each other rather than with a channel object, the communication between the adaptors is referred to as a channel 300A. Adaptors 200A, 200D, and 200B are members of channel 300A, while adaptors 200A, 200B, and 200C are members of channel 300B. The broker stores information related to the channels such as the adaptors connected to a channel, the roles of those adaptors (described below), and the properties of the channels.

Adaptors 200 in a channel 300 can communicate with each other by publishing data to the channel or publishing data to specific adaptors within the channel. By publishing data to the channel, or "broadcasting" to the channel, an adaptor can send data to multiple other adaptors. This is useful if there is an application 110 producing data which is of interest to multiple applications receiving the data. An adaptor may also have knowledge of the characteristics of the applications using the other adaptors on the channel and choose only one or a specified list of adaptors to receive its data. By using a broadcast-to-channel mechanism, an adaptor can easily send data to all adaptors on a channel (or all complementary adaptors on a channel as described below) without having specific knowledge of the adaptors on the channel. By using a mechanism to send to one or more adaptors specifically, an adaptor with specific knowledge of the adaptors it wishes to receive the message can reduce bandwidth over the communication mechanism 210 by sending a message to only the specific adaptors.

In one embodiment, adaptors 200 belonging to a channel 300 have assigned roles. In one embodiment, an adaptor can have the role of client (C), server (S), or peer (P) for a given channel. As an adaptor can belong to multiple channels, it can have different roles in different channels. For example, adaptor 200A is a server in channel 300A, while adaptor 200A is a peer in channel 300B. The client and server roles are complementary while the peer role is a self-complementary group. When an adaptor registered on a channel as a client publishes data to the channel, the data will be sent to all the servers on the channel, since clients and servers are complementary roles. Similarly, if a server publishes to a channel, the data will be sent to all clients on the channel. The peer role is a self-complementary group, so when a peer publishes to a channel, the data will be sent to all other peers in the channel. By having role differentiation within a channel, adaptors can publish data to a channel and automatically send to the subset of adaptors on the channel that are interested in the message without necessarily having knowledge of those specific adaptors, while also avoiding broadcasting the data to all adaptors on the channel and using unnecessary communication bandwidth. In some embodiments, some adaptors have no role and some adaptors are members of other sets of self-complementary or complementary roles (for example, video stream clients and video stream servers).

The broker 310, mentioned above, stores information related to the channels 300 in the communication mechanism 210. The functions of the broker can be implemented in hardware or software or both and may reside on the same entity as one or more adaptors 200 or on a separate entity. The broker is capable of digital communication with the adaptors. A broker can support multiple channels, and a communication mechanism can comprise multiple brokers, each supporting one or more channels. A single channel can be supported by multiple brokers. This may be useful for providing a backup broker in case the primary broker fails and for distributing the communication load to the broker from various adaptors. The broker stores information about each supported channel, including but not limited to the name or other identifier of the channel, the list of adaptors communicating on the channel, and the set of channel communication properties. In one embodiment, the channel communication properties may include the quality of service (QoS) of the data communication on the channel, such as the minimum bandwidth requirement, maximum latency requirement, or in-order packet delivery requirement. The properties can also include whether the channel communication is to be synchronous or asynchronous and the data format of the communication.

By using the communication mechanism 210, an adaptor 200 need not have knowledge a priori of other adaptors with which that adaptor may want to communicate. In one embodiment, an adaptor needs knowledge of only a channel 300 name and can then join the channel and communicate with appropriate entities on the channel. In another embodiment, an adaptor needs knowledge of only the characteristics of a channel it wishes to join (for example, based on a request from the application 110 associated with the adaptor). The adaptor can then query a broker 310, obtain a list of available channels with the characteristics of each, and then choose an appropriate channel to join. In another embodiment, the adaptor need not have knowledge of the existence of a particular broker. The adaptor can send a query to nearby entities, and available brokers can respond to the query. The adaptor can then contact an available broker to join or obtain information about a channel.

Also, by using the communication mechanism 210, there is no central point of failure. The failure of an adaptor 200 on a channel 300 will not generally result in the failure of the entire channel. An adaptor can still join a channel, publish to a channel, and receive from a channel even if one or more adaptors on the channel fail. An application communication system 120 can include multiple redundant adaptors so that the loss of a single adaptor will not prevent the channel from functioning as intended. Though a broker 310 can serve as a repository of information about one or more channels, the failure of a broker will not result in the immediate failure of one of its channels. Adaptors that have already joined the channel are still able to publish to and receive data from the channel. Though new adaptors will not be able to request information about the channel or join the channel without a broker, the communication mechanism can provide for the detection of failed brokers and create a new broker when an existing one fails. Throughout this process of creating a new broker, however, adaptors already communicating on the channel will be unaffected. The communication mechanism can also include backup brokers in case a primary broker fails.

In one embodiment, the adaptors 200 communicate with the broker 310 through a common mechanism known to all adaptors. Adaptors can generally know the location of the broker, or the broker can periodically communicate its location to adaptors. In another embodiment, the adaptors communicate with the broker through a specialized broker channel (not illustrated). The broker channel is a channel 300 known to all adaptors and is used when an adaptor needs to communicate to one or more brokers or when a broker needs to communicate with one or more adaptors. By using a broker channel for communication, an adaptor can communicate with a broker through its standard channel interface and does not need a different interface for broker communications.

Figure 4:
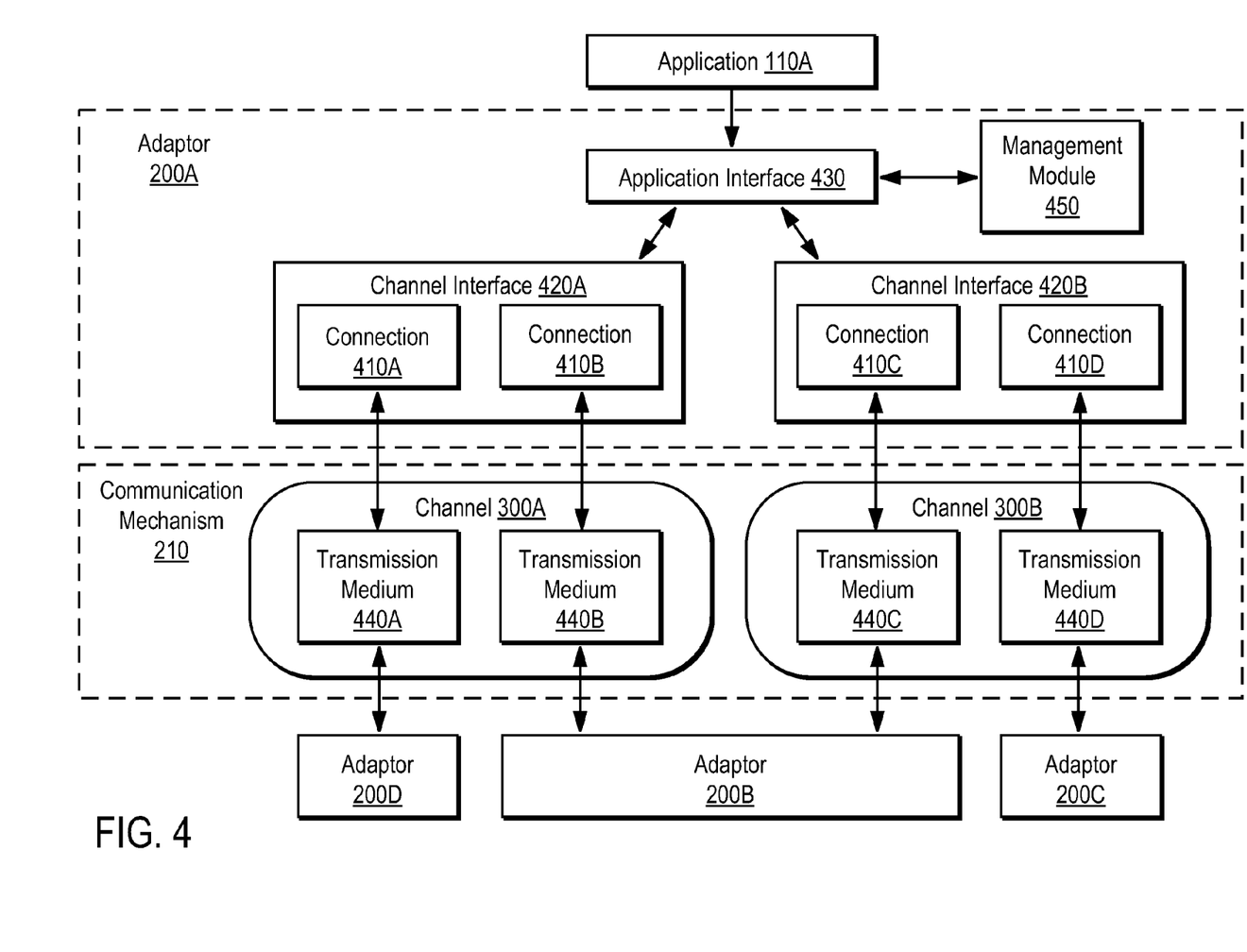
FIG. 4 illustrates a more detailed view of the flow of data between adaptors in an application communication system, according to one embodiment of the invention.

FIG. 4 illustrates a more detailed view of the flow of data between adaptors in an application communication system, according to one embodiment of the invention. FIG. 4 shows further details of communications to and from adaptor 200A. As an example to illustrate the process of an application 110 sending data, suppose that application 110A needs to publish data to complementary applications on channel 300A. In one embodiment, application 110A sends the data to adaptor 200A along with a request to publish the data to channel 300A. The application identifies the channel by, for example, a character string name or a numeric identifier. The application interface component 430 of adaptor 200A receives the data from application 110A and sends the data to channel interface 420A for transmission to other adaptors. Since adaptor 200A is aware of two other adaptors 200D and 200B on channel 300A, channel interface 420A maintains two connections 410A and 410B to adaptors 200D and 200B respectively.

As illustrated in FIG. 3, adaptor 200A has a server role on channel 300A while adaptors 200D and 200B have the complementary client role on channel 300A. As a result, channel interface 420A will publish the data on both connections 410A and 410B. Connections 410A and 410B will transmit the data from adaptor 200A to transmission media 440A and 440B. In one embodiment the data will be tagged to identify it as data intended for adaptors with client roles on channel 300A.

Transmission media 440 can be any digital communication transmission media such as a wired or wireless network, a hardware bus, or shared memory. Transmission media 440A, 440B, 440C, 440D can be the same or different transmission media or can be groups of different transmission media. For example, transmission media 440B and 440C can be the same shared memory and transmission media 440A and 440D can be two different ethernet LANs. Channel 300A is a logical representation of the communication taking place over transmission media 440A and 440B from channel interface 420A. Communication mechanism 210 comprises channels and transmission media.

As an example to illustrate the process of receiving data, suppose that application 110A is receiving data sent from adaptor 200B on channel 300A. The data is received by adaptor 200A listening for packets on the transmission media. In one embodiment, the data is received by connection 410B listening for data packets on the transmission medium 440B. Connection 410B listens for packets being sent to adaptor 200A on channel 300A or for packets being broadcast on channel 300A. Since adaptor 200A has a server role on channel 300A, connection 410B listens for broadcast packets sent from only an adaptor with a client role. In another embodiment, the data is received by channel interface 420A listening for data packets on the transmission medium 440B, and then the data is sent to connection 410B. After connection 410B receives and processes the data, it is sent to channel interface 420A which sends the data to application interface 430. Application interface 430 sends the data to application 110A which uses the data to perform its functions. In one embodiment, application 110A receives additional information about the data including the source adaptor, channel, connection, and interface through which it was received.

Figure 5:
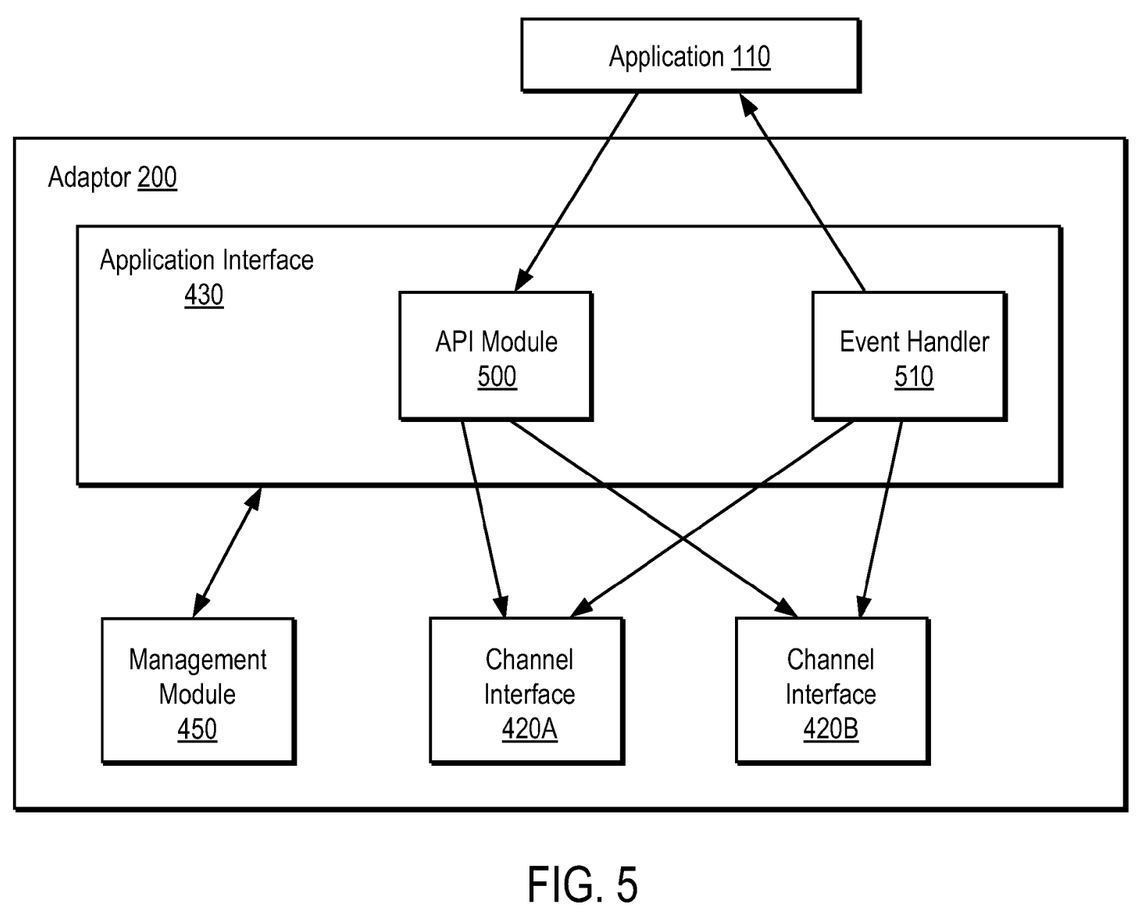
FIG. 5 illustrates a block diagram of an adaptor, including a management module and an application interface for enabling data communication through channels, according to one embodiment of the invention.

FIG. 5 illustrates a block diagram of an adaptor, including a management module and an application interface for enabling data communication through channels, according to one embodiment of the invention. The application interface 430 mentioned above serves the function of passing data between the application 110 and the channel interfaces 420. The application interface 430 enables the application to communicate over the application communication system 120 without knowledge of the communication mechanism 210.

The application interface 430 includes an API module 500 and an event handler 510. In one embodiment, when the application needs to send data to a channel 300 through a channel interface, the application calls a function in the API module 500 to send the data. For example, one function in the API module can be called sendToChannel( ) and take as parameters the channel name and the data to be sent. Another function in API module can be called sendToAdaptors( ) and take as parameters the channel name, a list of adaptors 200, and the data to be sent. These API functions can then pass the data to the appropriate channel interface for sending to the appropriate channel or adaptor.

In one embodiment, event handler 510 is responsible for passing packets from the channel interfaces 420 to the application 110. When a data packet arrives on a channel interface 420, it is sent asynchronously to the event handler. The event handler then examines the packet, determining for example the channel 300 and adaptor 200 it arrived from. In one embodiment, the event handler consults a subscription map (not shown) to determine if the application is interested in receiving the data and, if so, which function to call in the application to notify it of the data arrival. A lookup in the subscription map can be based on information relating to the data, for example the originating adaptor and channel of the data. After determining the appropriate application notification function, the event handler calls this function and provides the data or the location of the data to the application. The application notification function returns control to the event handler so that the event handler can receive more data from the channel interfaces.

The management module 450 performs management functions for the adaptor 200. Various API module 500 functions can be provided to the application for configuration through the management module. A list of possible example configuration functions is given in Table 1.

TABLE 1

| | |
|---|---|
| joinChannel( ) | Join a channel |
| leaveChannel( ) | Leave a channel |
| configureChannel( ) | Configure channel stack |
| subMapAddEntry( ) | Add an entry to the subscription map |

These API module 500 functions are called by the application 110. The API module then sends the request to the management module 450 which carries out the requested action and returns a response (if necessary) to the application 110 through the API module. In order to carry out configuration tasks, the management module may need to send data through the channel interfaces 420 or receive data from the channel interfaces using the API module or event handler 510. In addition to requests from the application, the management module can perform configuration tasks in response to data received from the channel interfaces. For example, if a channel interface receives a notification packet from the transmission media that another adaptor 200 has joined a channel 300 associated with a channel interface, the management module can create a new connection 410 in the appropriate channel interface to communicate with that adaptor. In one embodiment, the management module performs monitoring functions, such as discovering that a connection to another adaptor has been lost, or discovering that another adaptor has joined the channel. Notifications can be provided to the application through the event handler, enabling the application to take actions if necessary.

Figure 6:
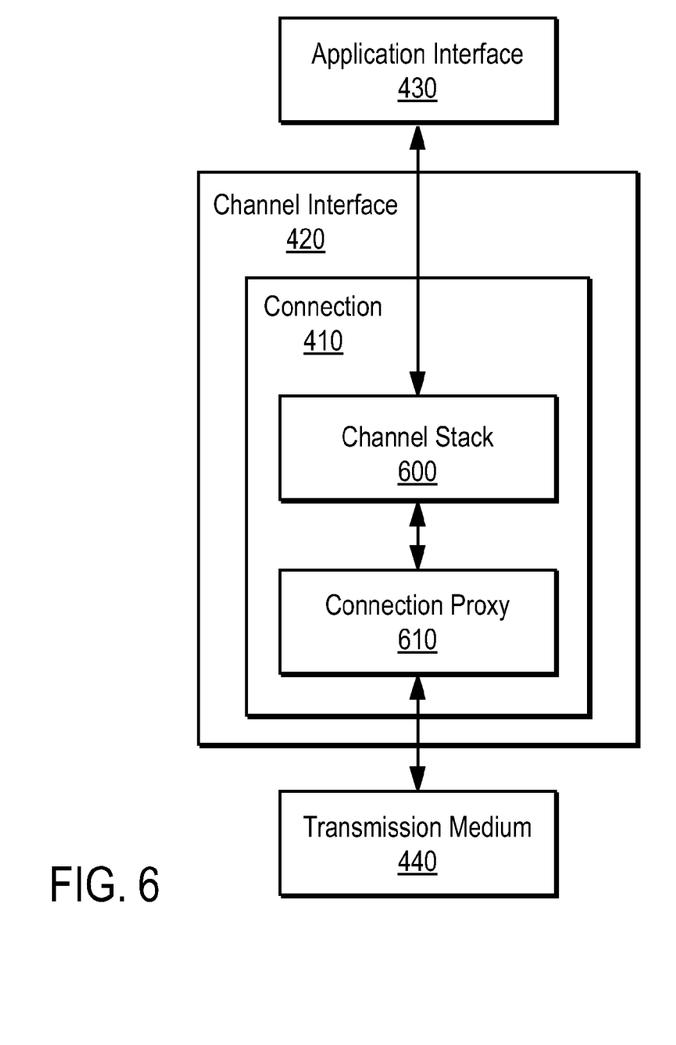
FIG. 6 illustrates a block diagram of data flow from the application interface to the transmission medium, according to one embodiment of the invention.

FIG. 6 illustrates a block diagram of data flow from the application interface to the transmission medium, according to one embodiment of the invention. A connection 410 maintains communication on the adaptor-to-adaptor level rather than the channel level communication of channel interfaces 420. As mentioned above, for each channel 300 which application 110 has joined, adaptor 200 contains a corresponding channel interface. Each channel interface contains a connection to each other adaptor which is a member of the channel associated with the channel interface. In another embodiment, connections are initially created for only the subset of adaptors on the channel with which the current adaptor is likely to communicate, while additional connections are later created as necessary. This embodiment better preserves resources in the adaptor such as memory and processing cycles.

Connection 410 comprises a channel stack 600 and a connection proxy 610. The connection proxy is responsible for sending to and receiving from the transmission medium 440. The connection proxy can comprise standard transport-layer and link-layer protocols. Examples include transmission control protocol (TCP), user datagram protocol (UDP), internet protocol (IP), ethernet, and shared memory access protocols. The connection proxy is adaptor 200 and connection 410 specific. For example, different adaptors with connections to the same channel 300 may have different connection proxies because of the need to communicate through different transmission media. The connection proxy effectively hides the details of underlying protocols from the channel stack.

In one embodiment, a connection proxy 610 is created by a connection proxy factory (not shown) when the need for a new connection arises. A new connection can be required, for example, when a new adaptor 200 joins a channel 300 to which the current adaptor is subscribed. The composition of the connection proxy will depend on the needs of the adaptor, transmission media 440, and the channel. In one embodiment, the connection proxy factory automatically determines the optimal protocols to be included in the connection proxy based on its knowledge of the transmission medium and the location of the other adaptor. For example, if the other adaptor is running on the same machine as the current adaptor, then the connection proxy factory may create a connection proxy with shared memory protocols rather than with network protocols such as TCP.

The channel stack 600 performs additional processing on data sent to and received from the connection proxy 610. The channel stack is channel-specific meaning that all connections to a particular channel 300 will have identically configured channel stacks. The channel stack can implement functions necessary for the proper transmission across the channel. One example includes data packet quality of service (QoS) which sends packets in such a way as to meet certain maximum or minimum bandwidth or latency limits.

Figure 7:
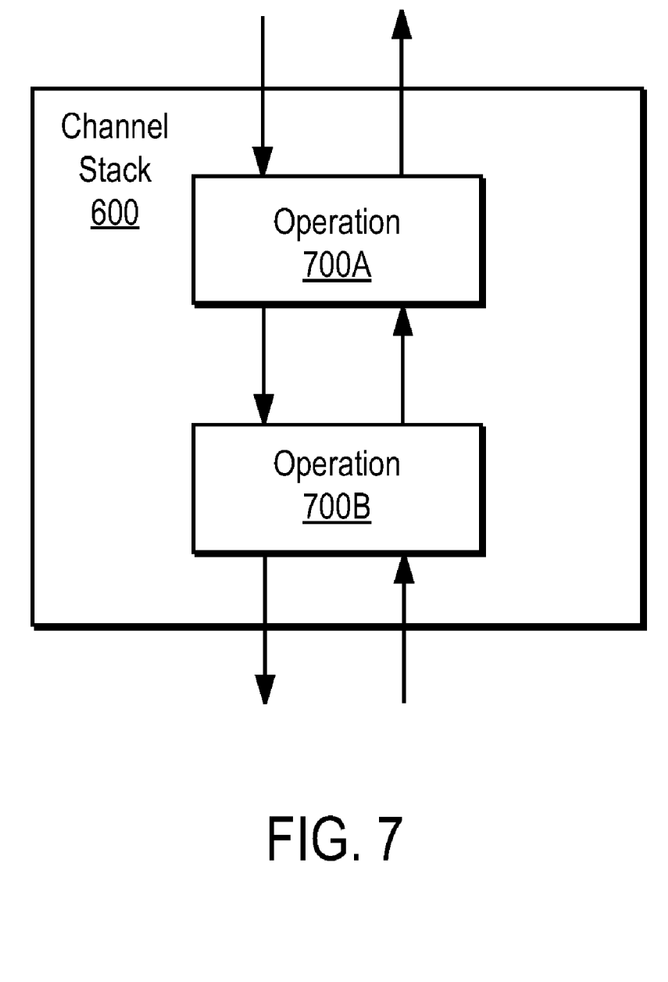
FIG. 7 illustrates a block diagram of the channel stack for customizing the flow of channel data as necessary, according to one embodiment of the invention.

FIG. 7 illustrates a block diagram of the channel stack for customizing the flow of channel data as necessary, according to one embodiment of the invention. As described above, the channel stack 600 can perform additional processing on the data sent to and received from the connection proxy 610. This processing is performed to meet the data communication needs of the channel and its applications 110. In one embodiment, the channel stack is comprised of layers of operations 700 which each implement a service-level protocol on channel data. For example, operation 700A may be a total order operation which ensures that all packets received from the channel are presented to the application in the order they were sent to the channel. This can be accomplished by looking at the packet sequence numbers and reordering the packets as necessary before sending them to the application interface 430. As another example, operation 700B can be a fragmentation operation which ensures that all packets sent from the application to the channel are limited to a certain maximum size. This can be accomplished by breaking larger packets into smaller packets that are smaller than the specified maximum size. The fragmentation operation can also reassemble fragmented packets received from the channel before sending them to the application. Other examples of operations include encryption, packet filtering, compression, or packet routing. In general, the channel stack can contain zero or more data processing operations.

In one embodiment, a channel stack 600 is created by a channel stack factory (not shown). A new channel stack is required, for example, when the adaptor 200 joins a new channel 300. Once a new channel stack is created for a particular channel interface 420, that channel stack can be copied as the need arises for new connections 410 within the same interface. The channel stack factory creates a channel stack with specific operations 700 based on information obtained about the channel. As described above, the broker 310 maintains a repository of information about one or more channels. When an adaptor joins a channel, it can obtain channel information from the broker which can then be used by the channel stack factory to configure the channel stack with the appropriate operations.

Figure 8:
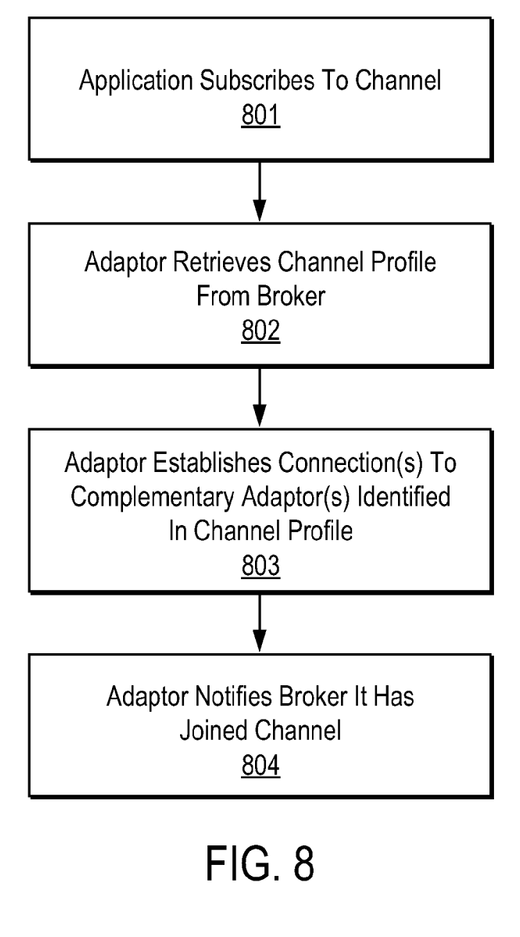
FIG. 8 illustrates a flowchart of a method for an application joining a channel, according to one embodiment of the invention.

FIG. 8 illustrates a flowchart of a method for an application joining a channel, according to one embodiment of the invention. In step 801, an application 110 subscribes to a channel 300 based on the communication requirements of the application. In one embodiment, the application calls the API module 500 and specifies a channel name and a role for the application on the channel.

In step 802, the adaptor 200 retrieves the channel profile from the broker 310. In one embodiment, the adaptor sends a channel profile request to a broker and the broker responds with the channel profile. This adaptor-broker communication can be through a specialized broker channel as described above or through some other mechanism.

In step 803, the adaptor establishes communications to complementary adaptors identified in the channel profile. In one embodiment, the management module 450 creates a channel interface 420 to the specified channel containing connections 410 to the complementary adaptors identified in the channel profile. The channel stack 600 in each connection can be configured based on the channel profile.

In step 804, the adaptor notifies the broker that it has joined the channel. In one embodiment, the broker responds with an acknowledgement that the adaptor has joined the channel and includes another channel profile to provide for the possibility that the channel profile changed since it was retrieved in step 802 (for example, an additional adaptor joined the channel). The broker updates its list of adaptors currently on the channel and provides the updated list to future adaptors requesting a channel profile. In one embodiment, the adaptor or the broker also notifies other adaptors currently on the channel that a new adaptor has joined. This enables other adaptors to create new connections as necessary.

Figure 9:
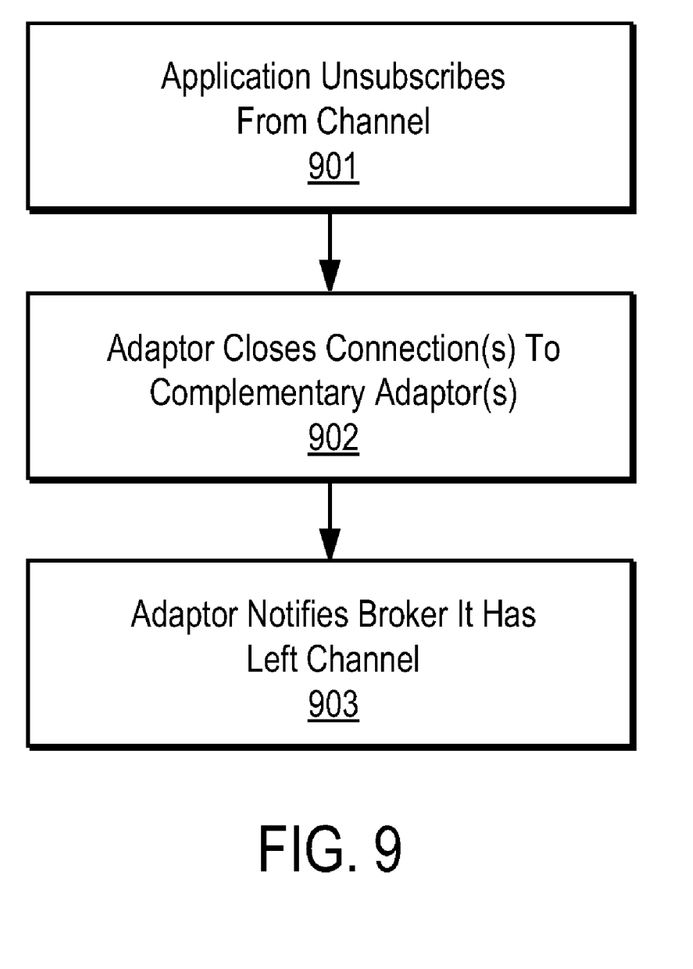
FIG. 9 illustrates a flowchart of a method for an application leaving a channel, according to one embodiment of the invention.

FIG. 9 illustrates a flowchart of a method for an application leaving a channel, according to one embodiment of the invention. In step 901, an application 110 unsubscribes from a channel 300 on which it no longer needs to communicate. In one embodiment, the application calls API module 500 and specifies a channel name from which to unsubscribe.

In step 902, the adaptor closes connections 410 to complementary adaptors on the channel. In one embodiment, the management module 450 removes a channel interface 420 to the specified channel containing connections 410 to the complementary adaptors identified in the channel profile.

In step 903, the adaptor notifies the broker 310 that it has left the channel. The broker updates its list of adaptors currently on the channel and provides the updated list to future adaptors requesting a channel profile. In one embodiment, the adaptor or the broker also notifies other adaptors currently on the channel that the adaptor has left the channel. This enables other adaptors to remove connections as necessary.

Although the invention has been described in considerable detail with reference to certain embodiments thereof, other embodiments are possible as will be understood to those skilled in the art.

What is claimed is:

1. A system for enabling communication between applications, comprising:
    a plurality of adaptors, each adaptor associated with a different application;
    one or more channels, a channel specifying connections between adaptors that are members of the channel; and
    a broker configured to maintain a repository of one or more profiles, each profile associated with a different channel and including information about one or more properties of the channel and information about adaptors that are members of the channel, the broker further configured to receive a query transmitted from a querying adaptor, the query including one or more desired channel properties, wherein responsive to the query, the broker returns a list of available channels that have the one or more channel properties specified in the query, wherein applications communicate with each other through their associated adaptors, wherein each adaptor in a particular channel communicates with a plurality of other adaptors that are members of the particular channel, the communication being over a connection between adaptors, and wherein each adaptor is configured to receive a profile associated with the particular channel from the broker.

2. The system of claim 1, wherein applications communicate with each other through their associated adaptors, and wherein the adaptors implement a channel-based communication mechanism, and wherein each adaptor provides the associated application with an interface to send data, receive data, perform channel operations, and configure the adaptor.

3. The system of claim 1, wherein each adaptor has a role within each channel of which it is a member, and wherein the role is either self-complementary or complementary to another role, and wherein an adaptor of a particular role communicates only with adaptors having a complementary role on the channel.

4. The system of claim 3, wherein the role is a server role or a complementary client role.

5. The system of claim 3, wherein the role is a self-complementary peer role.

6. The system of claim 1, wherein an adaptor communicates asynchronously.

7. The system of claim 1, wherein a first adaptor communicates with a second adaptor using an untyped byte stream.

8. The system of claim 1, wherein an adaptor communicates with the broker to receive a channel profile, join a channel, and leave a channel.

9. The system of claim 1, wherein an adaptor supports a channel-specific data processing operation specified in the channel profile.

10. The system of claim 9, wherein the channel-specific data processing operation includes one of quality of service, total ordering, encryption, and logging.

11. The system of claim 1, wherein a first adaptor determines a protocol for communication with a second adaptor based on a type of transmission media.

12. The system of claim 1, wherein an adaptor is a member of a plurality of channels and is configured to communicate with a different set of adaptors on each of the plurality of channels.

13. The system of claim 1, wherein communication between adaptors over the particular channel continues after the broker has failed.

14. The system of claim 1, wherein the connection between adapters is a connection not involving the broker.

15. In a system for communicating between applications that comprises a plurality of adaptors, each adaptor associated with a different application; one or more channels, a channel specifying connections between adaptors that are members of the channel; and a broker configured to maintain a repository of one or more profiles, each profile associated with a different channel and including information about one or more properties of the channel and information about adaptors that are members of the channel; a method for joining a channel, the method comprising:

receiving a request from an application to subscribe to a channel with a specific property;

transmitting a query to the broker, the query including the specific property and the query requesting a list of available channels having the specific property;

receiving from the broker in response to the query, the list of available channels have the specific property;

requesting, from the broker, a channel profile having the specific property from the list of available channels having the specific property;

receiving, from the broker, a particular channel profile having the specific property;

establishing a connection to a plurality of complementary adaptors identified in the particular channel profile; and notifying the broker that an adaptor has joined a channel corresponding to the particular channel profile.

* * * * *